(12) United States Patent
Akiba

(10) Patent No.: US 11,930,305 B2
(45) Date of Patent: Mar. 12, 2024

(54) CIRCUIT APPARATUS, CONTROL APPARATUS, AND LASER PROJECTOR

(71) Applicant: SEIKO EPSON CORPORATION, Tokyo (JP)

(72) Inventor: Yasutoshi Akiba, Chino (JP)

(73) Assignee: SEIKO EPSON CORPORATION (JP)

( * ) Notice: Subject to any disclaimer, the term of this patent is extended or adjusted under 35 U.S.C. 154(b) by 11 days.

(21) Appl. No.: 17/860,133

(22) Filed: Jul. 8, 2022

(65) Prior Publication Data

US 2023/0011356 A1 Jan. 12, 2023

(30) Foreign Application Priority Data

Jul. 9, 2021 (JP) ................................. 2021-114057

(51) Int. Cl.
*H04N 9/31* (2006.01)

(52) U.S. Cl.
CPC ......... *H04N 9/3185* (2013.01); *H04N 9/3129* (2013.01); *H04N 9/3182* (2013.01)

(58) Field of Classification Search
CPC .... G03B 21/006; G03B 21/008; G03B 21/28; G03B 21/147; G03B 21/2013; G03B 21/2033; G03B 21/2053; G03B 21/2066; H04N 9/3111; H04N 9/3129; H04N 9/3141; H04N 9/3161; H04N 9/3182; H04N 9/3185
See application file for complete search history.

(56) References Cited

U.S. PATENT DOCUMENTS

| | | | |
|---|---|---|---|
| 2002/0041383 A1* | 4/2002 | Lewis, Jr. ............... | H04N 23/81 358/1.9 |
| 2006/0119805 A1 | 6/2006 | Wittenberg et al. | |
| 2011/0025905 A1* | 2/2011 | Tanaka ................... | H04N 23/84 348/E5.04 |
| 2011/0037955 A1 | 2/2011 | Seo et al. | |
| 2014/0078474 A1* | 3/2014 | Nakao .................. | H04N 9/3182 353/31 |
| 2015/0172591 A1* | 6/2015 | Nobori ................. | H04N 9/3102 348/759 |
| 2016/0330418 A1 | 11/2016 | Nakai et al. | |
| 2017/0318271 A1 | 11/2017 | Sourani | |

(Continued)

FOREIGN PATENT DOCUMENTS

| | | |
|---|---|---|
| JP | 2011-039326 A | 2/2011 |
| JP | 2013-140224 A | 7/2013 |
| JP | 2014-228817 A | 12/2014 |

*Primary Examiner* — Sultan Chowdhury
(74) *Attorney, Agent, or Firm* — Harness, Dickey & Pierce, P.L.C.

(57) ABSTRACT

A circuit apparatus is used in a laser projector that projects an image onto a projection surface by using laser beams having different wavelengths or a plurality of colors. The circuit apparatus includes a distortion correction circuit and an output circuit. The distortion correction circuit performs distortion correction on a color basis on display image data corresponding to the plurality of colors. The output circuit outputs the display image data as a result of the distortion correction. The distortion correction circuit performs the distortion correction on a color basis by using warp parameters different from one another among the plurality of colors.

18 Claims, 11 Drawing Sheets

(56) References Cited

U.S. PATENT DOCUMENTS

| | | | |
|---|---|---|---|
| 2020/0004121 A1* | 1/2020 | Shimamura | G03B 21/2066 |
| 2020/0201035 A1* | 6/2020 | Anand | G06V 10/56 |
| 2020/0228767 A1* | 7/2020 | Ichieda | H04N 9/3194 |
| 2020/0342567 A1* | 10/2020 | Eric | G06T 3/005 |
| 2021/0021792 A1 | 1/2021 | Shin et al. | |

* cited by examiner

CIRCUIT APPARATUS, CONTROL APPARATUS, AND LASER PROJECTOR

The present application is based on, and claims priority from JP Application Serial Number 2021-114057, filed Jul. 9, 2021, the disclosure of which is hereby incorporated by reference herein in its entirety.

BACKGROUND

1. Technical Field

The present disclosure relates to a circuit apparatus, a control apparatus, and a laser projector.

2. Related Art

There are known laser projectors that display images by projecting a laser beam onto a projection surface. JP-A-2011-39326 discloses a laser projector including a laser data buffer. The laser data buffer includes a frame buffer that stores image data on a color basis, a write area provided for the color of each laser beam and where image data for one horizontal line is written, and a read area where the written image data for one horizontal line is stored. Based on positional shift information stored in a positional shift information table, the laser projector transfers image data for one horizontal line corresponding to vertical positional shifts from the frame buffer to the laser data buffer, and adjusts the lasers to be driven at timings corresponding to horizontal positional shifts. The laser projector thus corrects the vertical and horizontal positional shifts of the laser beams from one another on a projection receiving surface.

In the laser projector, the position where video images are displayed is shifted accordance with the colors of the laser beams resulting in color shifts in the displayed image. To solve the color shift problem, JP-A-2011-39326 requires an adjuster that adjusts the laser beam drive timings in addition to an image processing circuit, resulting in a problem of a complicated control circuit.

SUMMARY

An aspect of the present disclosure relates to a circuit apparatus used in a laser projector that projects an image onto a projection surface by using laser beams having different wavelengths or a plurality of colors, the circuit apparatus including a distortion correction circuit that performs distortion correction on a color basis on display image data corresponding to the plurality of colors, and an output circuit that outputs the display image data as a result of the distortion correction, and the distortion correction circuit performs the distortion correction on the color basis by using warp parameters different from one another among the plurality of colors.

Another aspect of the present disclosure relates to a control apparatus that controls a laser projector that projects an image onto a projection surface by using laser beams having different wavelengths or a plurality of colors, the control apparatus including a distortion correction circuit that performs distortion correction on a color basis on display image data corresponding to the plurality of colors, and an output circuit that outputs the display image data as a result of the distortion correction, and the distortion correction circuit performs the distortion correction on the color basis by using warp parameters different from one another among the plurality of colors.

Still another aspect of the present disclosure relates to a laser projector including the circuit apparatus described above, a plurality of laser light sources that output the laser beams having the plurality of colors, a laser light source control circuit that controls the plurality of laser light sources based on the display image data as a result of the distortion correction from the output circuit, and an optical system that projects the laser beams having the plurality of colors onto the projection surface.

Still another aspect of the present disclosure relates to a laser projector including the control apparatus described above, a plurality of laser light sources that output the laser beams having the plurality of colors, and an optical system that projects the laser beams having the plurality of colors onto the projection surface, and the control apparatus includes a laser light source control circuit that controls the plurality of laser light sources based on the display image data as a result of the distortion correction from the output circuit.

DESCRIPTION OF EXEMPLARY EMBODIMENTS

A preferable embodiment of the present disclosure will be described below in detail. It is not intended that the present embodiment described below unduly limits the contents described in the claims, and all configurations described in the present embodiment are not necessarily essential configuration requirements.

1. Configuration Example of Laser Projector

Figure 1:
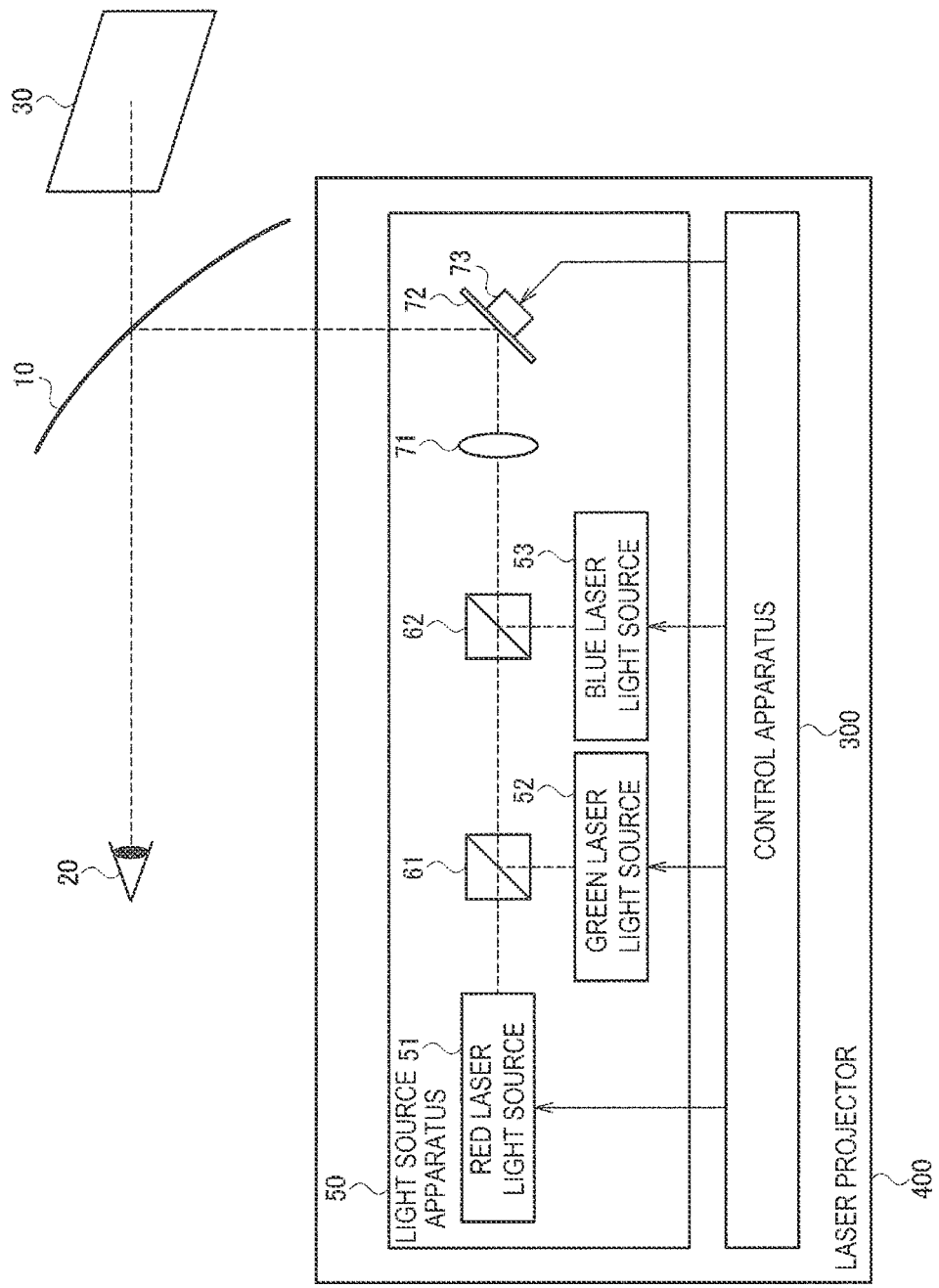
FIG. 1 shows a configuration example of a laser projector.

FIG. 1 shows a configuration example of a laser projector 400. The laser projector 400 includes a light source apparatus 50, which generates laser beams, and a control apparatus 300, which controls the light source apparatus 50. The following description will be made with reference to a case where the laser projector 400 is a head-up display.

The light source apparatus 50 includes a red laser light source 51, a green laser light source 52, a blue laser light source 53, dichroic mirrors 61 and 62, a lens 71, a mirror 72, and an actuator 73.

Provided that the wavelength region of visible light is divided into a red region, a green region, and a blue region, the red laser light source 51 outputs a red laser beam having a single wavelength that belongs to the red region. The green laser light source 52 outputs a green laser beam having a single wavelength that belongs to the green region. The blue laser light source 53 outputs a blue laser beam having a single wavelength that belongs to the blue region. The laser light sources are each, for example, a semiconductor laser.

The dichroic mirror 61 transmits the red laser beam and reflects the green laser beam to combine the red laser beam and the green laser beam with each other into a single beam. The dichroic mirror 62 transmits the light having exited out of the dichroic mirror 61 and reflects the blue laser beam to combine the light having exited out of the dichroic mirror 61 and the blue laser beam with each other into a single beam.

The lens 71 causes the light having exited out of the dichroic mirror 62 to converge in such a way that the laser beam to be projected onto a projection surface 10 via the mirror 72 converges onto the projection surface 10.

The mirror 72 reflects the laser beam from the lens 71 toward the projection surface 10 to project the laser beam onto the projection surface 10. The actuator 73 changes the inclination of the mirror 72 to change the angle at which the laser beam incident on the mirror 72 is reflected, so that the position where the laser beam is projected on the projection surface 10 is changed. Specifically, the actuator 73 changes the inclination of the mirror 72 to successively sweep a horizontal scanning line, as in what is called raster scanning. The actuator 73 is a device that converts an electrical signal into a mechanical action, for example, a piezoelectric actuator or a motor.

The dichroic mirrors 61 and 62, the lens 71, the mirror 72, and the actuator 73 described above form an optical system that projects the red laser beam, the green laser beam, and the blue laser beam onto the projection surface 10.

The control apparatus 300 drives the red laser light source 51, the green laser light source 52, and the blue laser light source 53, and controls the timings at which the laser light sources output the laser beams and the amounts of laser beam outputted therefrom based on display image data and timing control signals. The control apparatus 300 drives the actuator 73 to scan the projection surface 10 with the laser beam based on the timing control signals. The timing control signals are, for example, horizontal and vertical sync signals.

The projection surface 10 is a front screen or a wind screen of a moving vehicle that incorporates the laser projector 400, which is a heads-up display. The projection surface 10 may instead be a screen provided separately from the front screen or any other screen and exclusive to the head-up display. The laser beam projected by the laser projector 400 onto the projection surface 10 is reflected off the projection surface 10, and the reflected laser beam enters a user's eyes 20. The user's eyes 20 therefore regard the displayed image as an imaginary image 30.

The laser projector only needs to be an apparatus that displays images by projecting the laser beam onto the projection surface, for example, may be a head-mounted display. In this case, the projection surface is, for example, the last reflection surface of a light guide that causes the laser beam to enter the eyes, or the retina of the eyes.

The above description has been made with reference to a laser projector using three laser beams, the R laser beam, the G laser beam, and the B laser beam, by way of example, and the laser projector only needs to use two or more laser beams.

The configuration of the optical system that projects a plurality of color laser beams onto the projection surface is not limited to the configuration shown in FIG. 1. For example, how to combine a plurality of color laser beams into a single beam is not limited to using dichroic mirrors, and can, for example, be using optical fibers. The above description has been made with reference to the case where the projection method employed by the laser projector is the laser scan method, but not necessarily, and an optical system according to the projection method of the laser projector may be used. For example, a digital mirror device or an LCOS panel may be employed to project the laser beam onto the projection surface. LCOS is an abbreviation for liquid crystal on silicon. In these cases, a surface emitting laser or any other laser irradiates the entire reflection surface of a digital mirror device or any other device with the laser beam. A method using a light guide array may still instead be employed as the projection method. Such a light guide array has light exiting ends of a large number of light guides arranged in an array at the light exiting surface of the light guide array. Laser beams are incident via the light incident ends of the large number of light guides, and the laser beams that exit via the light exiting ends of the light guides are projected onto the projection surface to form an image.

2. First Configuration Example of Control Apparatus

Figure 2:
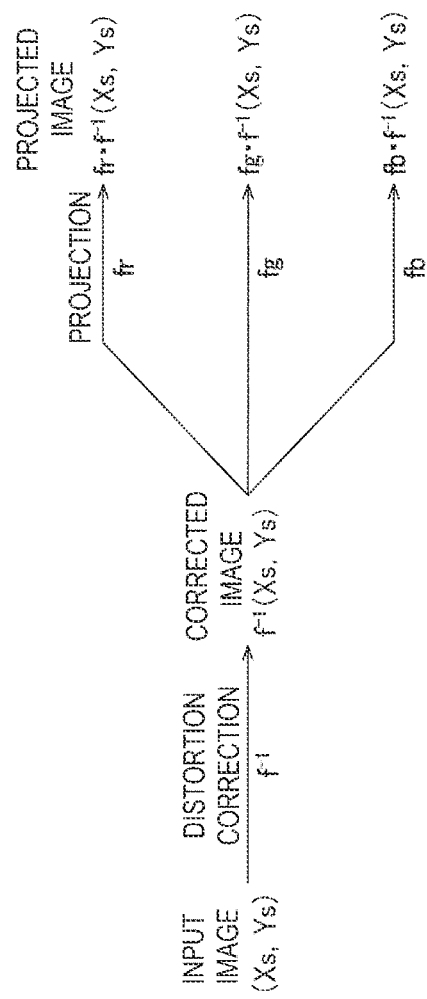
FIG. 2 describes a color shift problem with a laser projector of related art.

FIG. 2 describes the color shift problem with the laser projector of related art. The color shift used herein means that the position where video images are displayed is shifted for each of the colors of the laser beams, resulting in a color shift in the displayed image.

In a head-up display and other apparatuses, distortion correction is performed on an input image to correct video image distortion caused by distortion of the projection surface 10 or video image distortion due to the optical system. The same distortion correction is performed on RGB input images in related art. Let $f^{-1}$ be coordinate conversion performed by the distortion correction, and the position of each of the pixels that form the corrected image is $f^{-1}(Xs, Ys)$.

When the corrected image is projected onto the projection surface 10 via the optical system, the projected position slightly varies for each of the wavelengths of the laser beams due to the coherence and other properties of the laser beams. Let fr be the coordinate conversion used when a red image produced by the red laser beam is projected, let fg be the coordinate conversion used when a green image produced by the green laser beam is projected, and let fb be the coordinate conversion used when a blue image produced by the blue laser beam is projected. The position of each of the pixels of the red image is $fr \cdot f^{-1}(Xs, Ys)$, the position of each of the pixels of the green image is $fg \cdot f^{-1}(Xs, Ys)$, and the position of each of the pixels of the blue image is $fb \cdot f^{-1}(Xs, Ys)$.

For example, to perform the distortion correction with reference to the green image, which means f=fg, $fg \cdot f^{-1}$ (Xs, Ys)=(Xs, Ys). Since fr≠fg≠fb, however, $fr \cdot f^{-1}(Xs, Ys) \neq (Xs, Ys)$ and $fb \cdot f^{-1}(Xs, Ys) \neq (Xs, Ys)$. The above description means that a pixel in the position (Xs, Ys) in an input image is projected to different positions $fr \cdot f^{-1}(Xs, Ys) \neq fg \cdot f^{-1}(Xs, Ys) \neq fb \cdot f^{-1}(Xs, Ys)$ on a color basis.

The position of a pixel of an input image and the position of a pixel of a projected image are expressed by the same symbol (Xs, Ys) in the above description, and the position (Xs, Ys) of a pixel of the projected image actually means the position on the projection surface 10 corresponding to the position (Xs, Ys) of the pixel of the input image.

Figure 3:
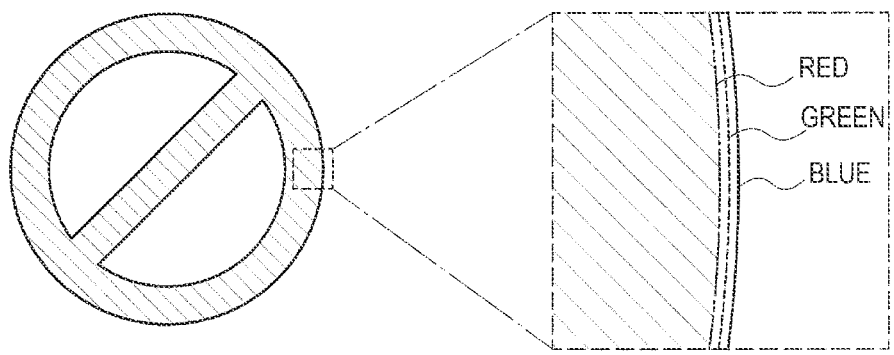
FIG. 3 shows an example of the color shift in an image displayed by the laser projector.

FIG. 3 shows an example of the color shift in an image displayed by the laser projector 400. FIG. 3 shows an example in which the laser projector 400 displays a predetermined mark, and is an enlarged view of part of the displayed mark.

The position where the red image is displayed, the position where the green image is displayed, and the position where the blue image is displayed slightly differ from one another, as shown in FIG. 3. For this reason, the edge of the mark is displayed by being shifted by the respective colors, for example, and the edge of the mark appears to be colored by a color that is not set originally. In the example shown in FIG. 3, the edge of the mark is likely to appear to be colored green or blue. The shifts of the display positions on a color basis are visible to the user as a color shift of the displayed image as described above, but the control apparatus 300 according to the present embodiment corrects the color shift with the aid of image data processing using the distortion correction. The color shift correction in the present embodiment will be described below.

Figure 4:
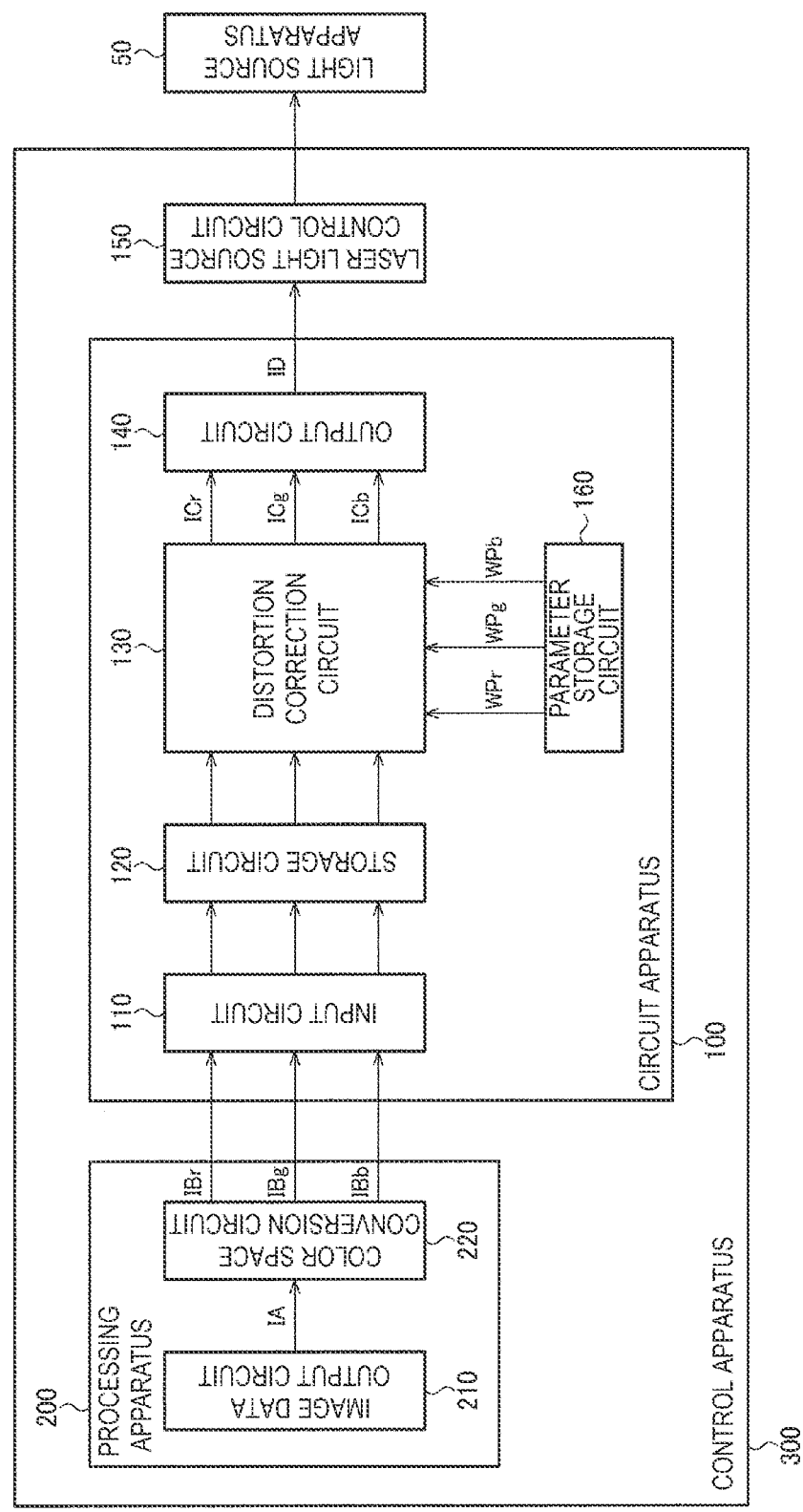
FIG. 4 shows a first configuration example of a control apparatus according to an embodiment of the present disclosure.

FIG. 4 shows a first configuration example of the control apparatus 300 according to the present embodiment. The control apparatus 300 includes a processing apparatus 200, a circuit apparatus 100, and a laser light source control circuit 150. The following description will be made with reference to the case where RGB laser beams are used, but the colors of the laser beams are not limited to RGB, and the number of colors is not limited to three. In the following description, red, green, and blue can be referred to as first, second, and third colors, respectively.

The processing apparatus 200 transmits display image data to the circuit apparatus 100. In the first configuration example, the processing apparatus 200 transmits display image data having undergone color space conversion to the circuit apparatus 100. The processing apparatus 200 includes an image data output circuit 210 and a color space conversion circuit 220. The processing apparatus 200 is, for example, a processor such as a CPU or a microcomputer. The processing apparatus 200 may instead be an FPGA or an ASIC. CPU is an abbreviation for a central processing unit. FPGA is an abbreviation for a field-programmable gate array. ASIC is an abbreviation for an application specific integrated circuit.

The image data output circuit 210 outputs display image data IA to the color space conversion circuit 220. For example, the image data output circuit 210 draws an image based, for example, on image data stored in a memory that is not shown, a signal inputted from a sensor or any other device provided in the moving vehicle, or data acquired from an external instrument through communication, and outputs the image data as the display image data IA.

The color space conversion circuit 220 converts the color space of the display image data IA and outputs display image data IBr, IBg, and IBb having undergone the color space conversion. IBr represents red image data, IBg represents green image data, and IBb represents blue image data. Specifically, the display image data IA represents an RGB color image, and the colors of the RGB image are expressed in a predetermined color space. The color space conversion circuit 220 converts the predetermined color space of the display image data IA into the color space produced by the RGB laser beams. The color space conversion circuit 220, for example, multiplies pixel data (DAr, DAg, DAb) in the display image data IA by a three-row-by-three-column conversion matrix representing the color space conversion to determine pixel data (DBr, DBg, DBb) in the display image data having undergone the color space conversion.

The circuit apparatus 100 performs the color shift correction along with the distortion correction by performing the distortion correction on a color basis on the display image data IBr, IBg, and IBb having undergone the color space conversion, and outputs output image data ID having undergone the correction to the laser light source control circuit 150. The circuit apparatus 100 includes an input circuit 110, a storage circuit 120, a distortion correction circuit 130, an output circuit 140, and a parameter storage circuit 160. The circuit apparatus 100 is also called a display controller. When the laser projector 400 is a head-up display, the circuit apparatus 100 is also called an HUD controller. The circuit apparatus 100 is an integrated circuit apparatus in which a plurality of circuit elements are integrated in a semiconductor substrate. The circuit apparatus 100 may instead be a processor such as a CPU or a microcomputer.

The input circuit 110 receives the display image data IBr, IBg, and IBb having undergone the color space conversion from the processing apparatus 200. The input circuit 110 may be a reception circuit formed of any of a variety of communication interfaces, and may, for example, be a reception circuit using LVDS, DVI, DisplayPort, GMSL, or GVIF. LVDS is an abbreviation for Low Voltage Differential Signaling, DVI is an abbreviation for Digital Visual Interface, GMSL is an abbreviation for Gigabit Multimedia Serial Link, and GVIF is an abbreviation for Gigabit Video InterFace.

The storage circuit 120 stores the display image data IBr, IBg, and IBb having been received by the input circuit 110 and having undergone the color space conversion. The storage circuit 120 is, for example, a line latch circuit or a semiconductor memory such as an SRAM or a DRAM.

The parameter storage circuit 160 stores warp parameters WPr, WPg, and WPb corresponding to the RGB colors. WPr is the warp parameter for red images, WPg is the warp parameter for green images, and WPb is the warp parameter for blue images. The parameter storage circuit 160 is, for example, a nonvolatile memory such as an EEPROM, and the warp parameters WPr, WPg, and WPb are written to the nonvolatile memory, for example, at the time of manufacture of the laser projector 400. The parameter storage circuit 160 may instead be a volatile memory such as an SRAM or a DRAM, and the processing apparatus 200 may write the warp parameters WPr, WPg, and WPb to the volatile memory.

The distortion correction circuit 130 performs the distortion correction on a color basis on the display image data IBr, IBg, and IBb and outputs display image data ICr, ICg, and ICb having undergone the correction. That is, the distortion correction circuit 130 warps the red image data IBr by using the warp parameter WPr for red images, warps the green image data IBg by using the warp parameter WPg for green images, and warps the blue image data IBb by using the warp parameter WPb for blue images. The warp parameters WPr, WPg, and WPb are parameters that associate the pixel positions in the display image data IBr, IBg, and IBb with the pixel positions in the display image data ICr, ICg, and ICb having undergone the distortion correction. The parameters may be in the form of a lookup table that associates the two types of pixel positions with each other, or may be polynomial coefficients representing the association between the two types of pixel positions.

The distortion correction circuit 130 is formed of a logic circuit, for example, an automatically placed and routed gate array or an automatically routed standard cell array. The distortion correction circuit 130 may be either a forward warp engine or a reverse warp engine. The forward warp is a warp process of moving each pixel of an input image to destination coordinates corresponding to the pixel. In this case, the warp parameters are each a parameter that associates each pixel of the input image with the destination coordinates corresponding to the pixel, or a parameter that associates each pixel of the input image with the amount of relative movement to the destination coordinates corresponding to the pixel. The reverse warp is a warp process of moving each pixel in the output image to source coordinates corresponding to the pixel and determining pixel data on the output image from the input image pixel data in the source image. In this case, the warp parameters are each a parameter that associates each pixel of the output image with the source coordinates corresponding to the pixel, or a parameter that associates each pixel of the output image with the amount of relative movement from the source coordinates corresponding to the pixel.

The output circuit 140 transmits the display image data IBr, IBg, and IBb having undergone the distortion correction to the laser light source control circuit 150 as the output image data ID. The output circuit 140 may be a transmission circuit formed of any of a variety of communication interfaces, and may, for example, be a transmission circuit using LVDS, DVI, DisplayPort, GMSL, or GVIF.

The laser light source control circuit 150 controls the light source apparatus 50 based on the output image data ID and the timing control signals. Taking the configuration example in FIG. 1 as an example, the laser light source control circuit 150 drives the red laser light source 51, the green laser light source 52, and the blue laser light source 53, and controls the timings at which the laser light sources output laser beams and the amounts of laser beams outputted therefrom based on output image data ID and the timing control signals. The laser light source control circuit 150 further drives the actuator 73 to scan the projection surface 10 with the laser beams based on the timing control signals. The timing control signals are, for example, horizontal and vertical sync signals. The laser light source control circuit 150 is formed, for example, of a laser light source drive circuit that drives the laser light sources, an actuator drive circuit that drives the actuator 73, and a control circuit that controls the two circuits described above.

Figure 5:
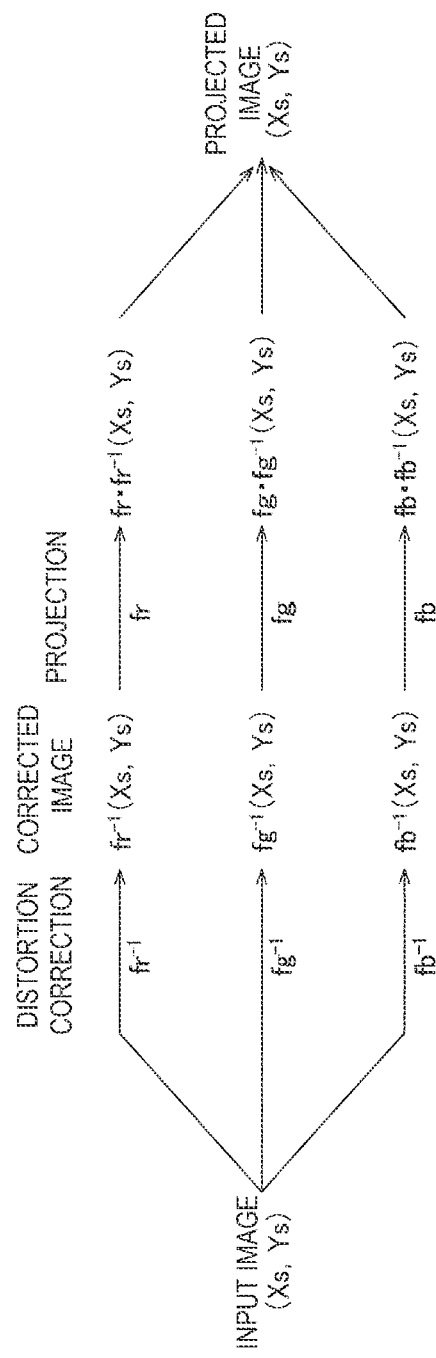
FIG. 5 describes distortion correction and color shift correction in the embodiment.

FIG. 5 describes the distortion correction and the color shift correction in the present embodiment. Let (Xs, Ys) be the position of a pixel in the display image data IBr, IBg, and IBb, which are input images. The RGB pixels have the same position.

Coordinate conversion $fr^{-1}$ represents the distortion correction to be performed on the red image data IBr, coordinate conversion $fg^{-1}$ represents the distortion correction to be performed on the green image data IBg, and coordinate conversion $fb^{-1}$ represents the distortion correction to be performed on the blue image data IBb. The position of a pixel of a red corrected image is $fr^{-1}(Xs, Ys)$, the position of a pixel of a green corrected image is $fg^{-1}(Xs, Ys)$, and the position of a pixel of a blue corrected image is $fb^{-1}(Xs, Ys)$. Since $fr^{-1} \neq fg^{-1} \neq fb^{-1}$, $fr^{-1}(Xs, Ys) \neq fg^{-1}(Xs, Ys) \neq fb^{-1}(Xs, Ys)$.

Let fr be the coordinate conversion used when a red image produced by the red laser beam is projected, let fg be the coordinate conversion used when a green image produced by the green laser beam is projected, and let fb be the coordinate conversion used when a blue image produced by the blue laser beam is projected. The position of a pixel in the red image is $fr \cdot fr^{-1}(Xs, Ys)=(Xs, Ys)$, the position of a pixel in the green image is $fg \cdot fg^{-1}(Xs, Ys)=(Xs, Ys)$, and the position of a pixel in the blue image is $fb \cdot fb^{-1}(Xs, Ys)=(Xs,$ Ys). That is, the positions of the pixels of the red image, the positions of the pixels of the green image, and the positions of the pixels of the blue image are not shifted from one another, so that the color shift is corrected.

The position of a pixel of an input image and the position of a pixel of a projected image are expressed by the same symbol (Xs, Ys) in the above description, and the position (Xs, Ys) of a pixel of the projected image actually means the position on the projection surface 10 corresponding to the position (Xs, Ys) of the pixel of the input image.

In the embodiment described above, the circuit apparatus 100 is used in the laser projector 400, which projects an image onto the projection surface 10 by using laser beams having different wavelengths or a plurality of colors. The circuit apparatus 100 includes the distortion correction circuit 130 and the output circuit 140. The distortion correction circuit 130 performs the distortion correction on a color basis on the display image data IBr, IBg, and IBb corresponding to the plurality of colors. The output circuit 140 outputs the display image data ICr, ICg, and ICb having undergone the distortion correction. The distortion correction circuit 130 performs the distortion correction on a color basis by using the warp parameters WPr, WPg, and WPb different from one another on a color basis.

According to the present embodiment, the distortion correction circuit 130 can correct the shifts of the display positions on a color basis by performing the distortion correction on a color basis using the warp parameters WPr, WPg, and WPb different from one another among the plurality of colors. That is, the distortion correction circuit 130 can differentiate the amount of distortion correction among the plurality of colors by performing the distortion correction on a color basis, whereby the correction of the shifts of the display positions on a color basis can be part of the distortion correction. That is, the distortion correction circuit 130 can correct video image distortion caused by distortion of the screen or any other component and further correct the shifts of the display positions on a color basis. The color shift can thus be corrected based on the image data processing, whereby the circuit can be simplified as compared with the scan timing adjustment approach described in JP-A-2011-39326.

Figure 6:
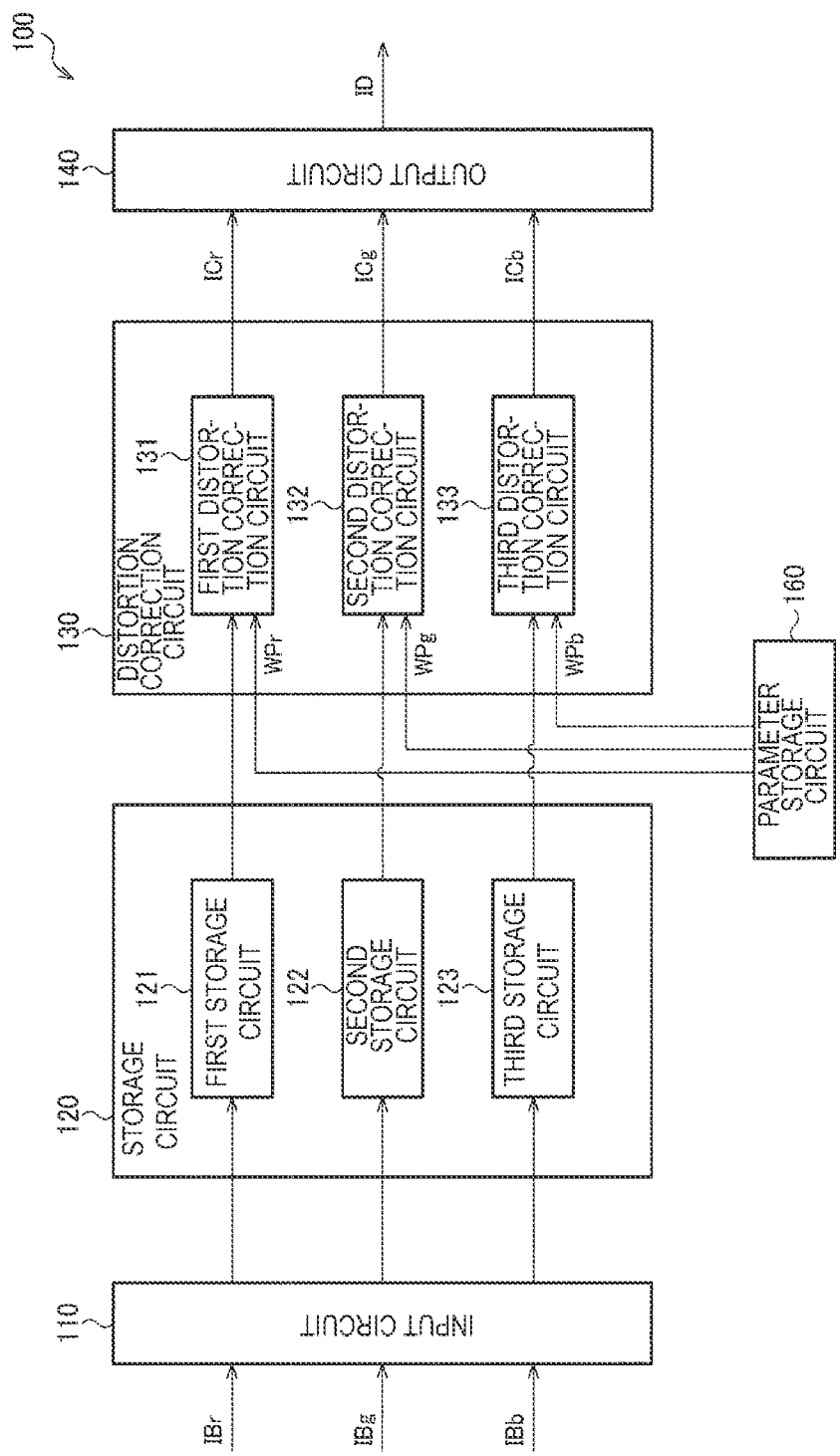
FIG. 6 shows a first detailed configuration example of a circuit apparatus.

The distortion correction circuit 130 performs the distortion correction in parallel on a color basis, as will be described later in FIG. 6, but not necessarily. The distortion correction circuit 130 may perform the distortion correction on a color basis in a time-division manner. For example, when RGB laser beams are used, the distortion correction circuit 130 may perform the distortion correction performed on the red image data, the distortion correction performed on the green image data, and the distortion correction performed on the blue image data in a time-division manner. In this case, there is no need to divide the storage circuit on a color basis as shown in FIG. 6, and the display image data corresponding to all the three colors may be stored in the same storage circuit.

In the present embodiment, the warp parameters WPr, WPg, and WPb on a color basis are warp parameters based on the image distortion caused by distortion of the projection surface 10, the image distortion caused by the optical system, and the shifts of the display positions on a color basis.

When the distortion correction circuit 130 performs the distortion correction on a color basis by using the thus determined warp parameters, the image distortion caused by distortion of the projection surface 10 and the image distortion caused by the optical system can be corrected, and the shifts of the display positions on a color basis can also be corrected.

The image distortion caused by distortion of the projection surface 10 is image distortion caused by non-planarity of the projection surface 10, such as a curved projection surface 10. The image distortion caused by the optical system is, for example, image distortion due to distortion aberration produced by the optical system or trapezoidal distortion caused by inclination of the projection angle with respect to the projection surface 10. The shifts of the display positions on a color basis have been described above.

In the present embodiment, the display image data IBr, IBg, and IBb are the image data having undergone the color space conversion into the color space corresponding to the wavelengths of the laser beams.

The color space of the display image data before the color space conversion typically differs from the color space produced by the laser beams. The display image data displayed with no change are therefore displayed in colors different from originally intended colors. According to the present embodiment, in which the display image data having undergone the color space conversion into the color space corresponding to the wavelengths of the laser beams are displayed, the displayed image has appropriate colors.

In the present embodiment, the plurality of colors include red, green, and blue.

The laser projector thus uses laser beams having at least the three primary colors or RGB to display an image and can therefore display an RGB color image.

The hardware configuration of the control apparatus 300 described with reference to FIG. 1 is merely an example. That is, the hardware configuration of the control apparatus 300 is not limited to that shown in FIG. 1 as long as the control apparatus 300 is configured as described below. The control apparatus 300 controls the laser projector 400, which projects an image onto the projection surface 10, by using laser beams having different wavelengths or a plurality of colors. The control apparatus 300 includes the distortion correction circuit 130 and the output circuit 140. The distortion correction circuit 130 performs the distortion correction on a color basis on the display image data IBr, IBg, and IBb corresponding to the plurality of colors. The output circuit 140 outputs the display image data ICr, ICg, and ICb having undergone the distortion correction. The distortion correction circuit 130 performs the distortion correction on a color basis by using the warp parameters WPr, WPg, and WPb on a color basis different from one another to correct the shifts of the display positions on a color basis.

3. First and Second Detailed Configuration Examples of Circuit Apparatus

FIG. 6 shows a first detailed configuration example of the circuit apparatus 100. The same components as those already described have the same reference characters and will not be described as appropriate.

The storage circuit 120 includes a first storage circuit 121, which stores the red image data IBr, a second storage circuit 122, which stores the green image data IBg, and a third storage circuit 123, which stores the blue image data IBb. The first storage circuit 121, the second storage circuit 122, and the third storage circuit 123 are storage circuits from which data can be simultaneously read in parallel. That is, separate line latch circuits or memories corresponding to the storage circuits are provided, and read addresses can be independently specified in the storage circuits.

The distortion correction circuit 130 includes a first distortion correction circuit 131, a second distortion correction circuit 132, and a third distortion correction circuit 133. The first distortion correction circuit 131 warps the red image data IBr stored in the first storage circuit 121 by using the warp parameter WPr for red images and outputs the red image data ICr having undergone the distortion correction. The second distortion correction circuit 132 warps the green image data IBg stored in the second storage circuit 122 by using the warp parameter WPg for green images and outputs the green image data ICg having undergone the distortion correction. The third distortion correction circuit 133 warps the blue image data IBb stored in the third storage circuit 123 by using the warp parameter WPb for blue images and outputs the blue image data ICb having undergone the distortion correction.

Taking the reverse warp as an example, in determination of pixel data at a certain pixel position in the red image data ICr, which is the output image, the first distortion correction circuit 131 uses the warp process to determine the pixel position in the source red image data IBr that corresponds to the certain pixel position. The first distortion correction circuit 131 specifies a read address corresponding to the pixel position, reads the pixel data in the red image data IBr from the first storage circuit 121, and uses the read pixel data to determine the pixel data in the red image data ICr. The second distortion correction circuit 132 and the second storage circuit 122 perform the same process on the green image data IBg, and the third distortion correction circuit 133 and the third storage circuit 123 perform the same process on the blue image data IBb.

In the present embodiment described above, the circuit apparatus includes the storage circuits on a color basis that store the display image data IBr, IBg, and IBb.

According to the present embodiment, data can be read out by independently specifying read addresses on a color basis in the storage circuits. The distortion correction on a color basis and the color shift correction can be achieved without an increase in the frequency of the operating clock, that is, at the same frequency of the operating clock as that used when the same distortion correction is performed for all the three colors.

More specifically, the circuit apparatus 100 includes the first storage circuit 121, which stores first display image data corresponding to the first color among a plurality of colors including the first, second, and third colors, the second storage circuit 122, which stores second display image data corresponding to the second color, and the third storage circuit 123, which stores third display image data corresponding to the third color. The distortion correction circuit 130 includes the first distortion correction circuit 131, the second distortion correction circuit 132, and the third distortion correction circuit 133. The first distortion correction circuit 131 performs the distortion correction on the first display image data from the first storage circuit 121 by using a first warp parameter corresponding to the first color. The second distortion correction circuit 132 performs the distortion correction on the second display image data from the second storage circuit 122 by using a second warp parameter corresponding to the second color. The third distortion correction circuit 133 performs distortion correction on the third display image data from the third storage circuit 123 by using a third warp parameter corresponding to the third color.

In the example shown in FIG. 6, the first, second, and third colors are red, green, and blue, respectively, and the first display image data is the red image data IBr, the second display image data is the green image data IBg, and the third display image data is the blue image data IBb. The first warp parameter is the warp parameter WPr for red images, the second warp parameter is the warp parameter WPg for green images, and the third warp parameter is the warp parameter WPb for blue images.

According to the present embodiment, the first, second, and third distortion correction circuits can independently specify read addresses in the first, second, and third storage circuits, respectively, to read data therefrom. The distortion correction on a color basis and the color shift correction can be achieved without an increase in the frequency of the operating clock, that is, at the same frequency of the operating clock as that used when the same distortion correction is performed for all the three colors.

Taking the reverse warp as an example, when the distortion correction circuit 130 determines pixel data at a certain pixel position in the output image ID, the source pixel position corresponding to the pixel position varies on a color basis. That is, the address of the pixel data to be read by the first distortion correction circuit 131 from the first storage circuit 121, the address of the pixel data to be read by the second distortion correction circuit 132 from the second storage circuit 122, and the address of the pixel data to be read by the third distortion correction circuit 133 from the third storage circuit 123 differ from one another. According to the present embodiment, the distortion correction circuit 130 can read data independently from the first storage circuit 121, the second storage circuit 122, and the third storage circuit 123, whereby the first distortion correction circuit 131, the second distortion correction circuit 132, and the third distortion correction circuit 133 can perform the distortion correction in parallel.

Figure 7:
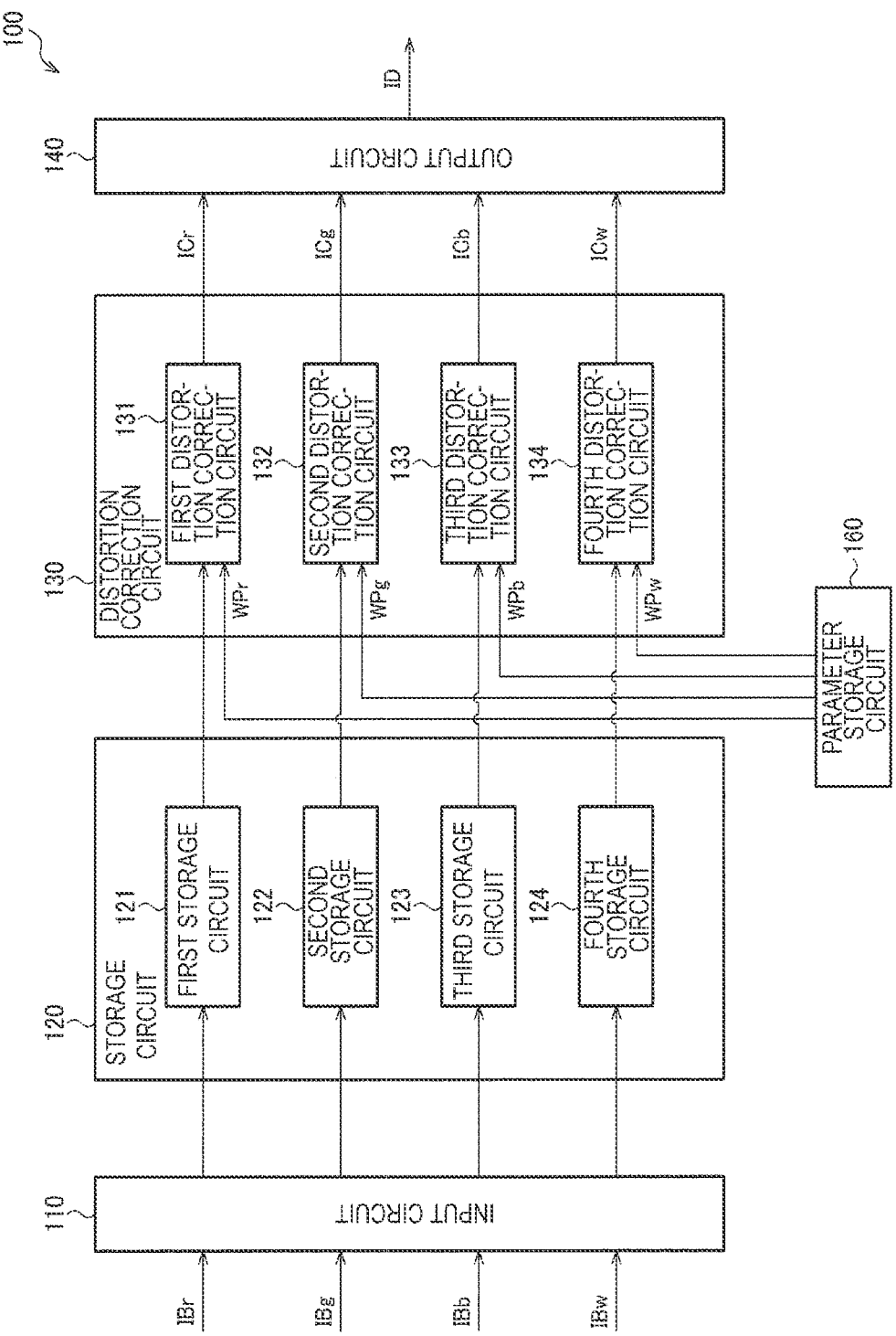
FIG. 7 shows a second detailed configuration example of the circuit apparatus.

FIG. 6 shows an example where the number of colors of the laser beams is three, and the number of colors of the laser beams only needs to be two or more. As an example, a case where laser beams having four colors are used will be described below. FIG. 7 shows a second detailed configuration example of the circuit apparatus 100. The same components as those already described have the same reference characters and will not be described as appropriate.

The second detailed configuration example is a case where the laser projector 400 uses laser beams having four colors to display an image. The laser beams of the four colors are, for example, the red laser beam, the green laser beam, the blue laser beam, and an additional laser beam having any wavelength different from those of the three laser beams.

The color space conversion circuit 220 of the processing apparatus 200 generates display image data IBr, IBg, IBb, and IBw corresponding to the four colors by performing the color space conversion on the RGB display image data IA. It is assumed that IBw is called fourth color image data.

The storage circuit 120 includes the first storage circuit 121, the second storage circuit 122, the third storage circuit 123, and a fourth storage circuit 124. Data is readable independently from the storage circuits. The fourth storage circuit 124 stores the fourth color image data received by the input circuit 110.

The parameter storage circuit 160 stores warp parameters WPr, WPg, WPb, and WPw corresponding to the four colors. WPw is the warp parameter for fourth color images.

The distortion correction circuit 130 includes the first distortion correction circuit 131, the second distortion correction circuit 132, the third distortion correction circuit 133, and a fourth distortion correction circuit 134. The fourth distortion correction circuit 134 warps the fourth image data IBw stored in the fourth storage circuit 124 by using the warp parameter WPw for fourth images and outputs fourth image data ICw having undergone the distortion correction.

The output circuit 140 transmits the display image data IBr, IBg, IBb, and IBw having undergone the distortion correction to the laser light source control circuit 150 as the output image data ID.

4. Second and Third Configuration Examples of Control Apparatus

Figure 8:
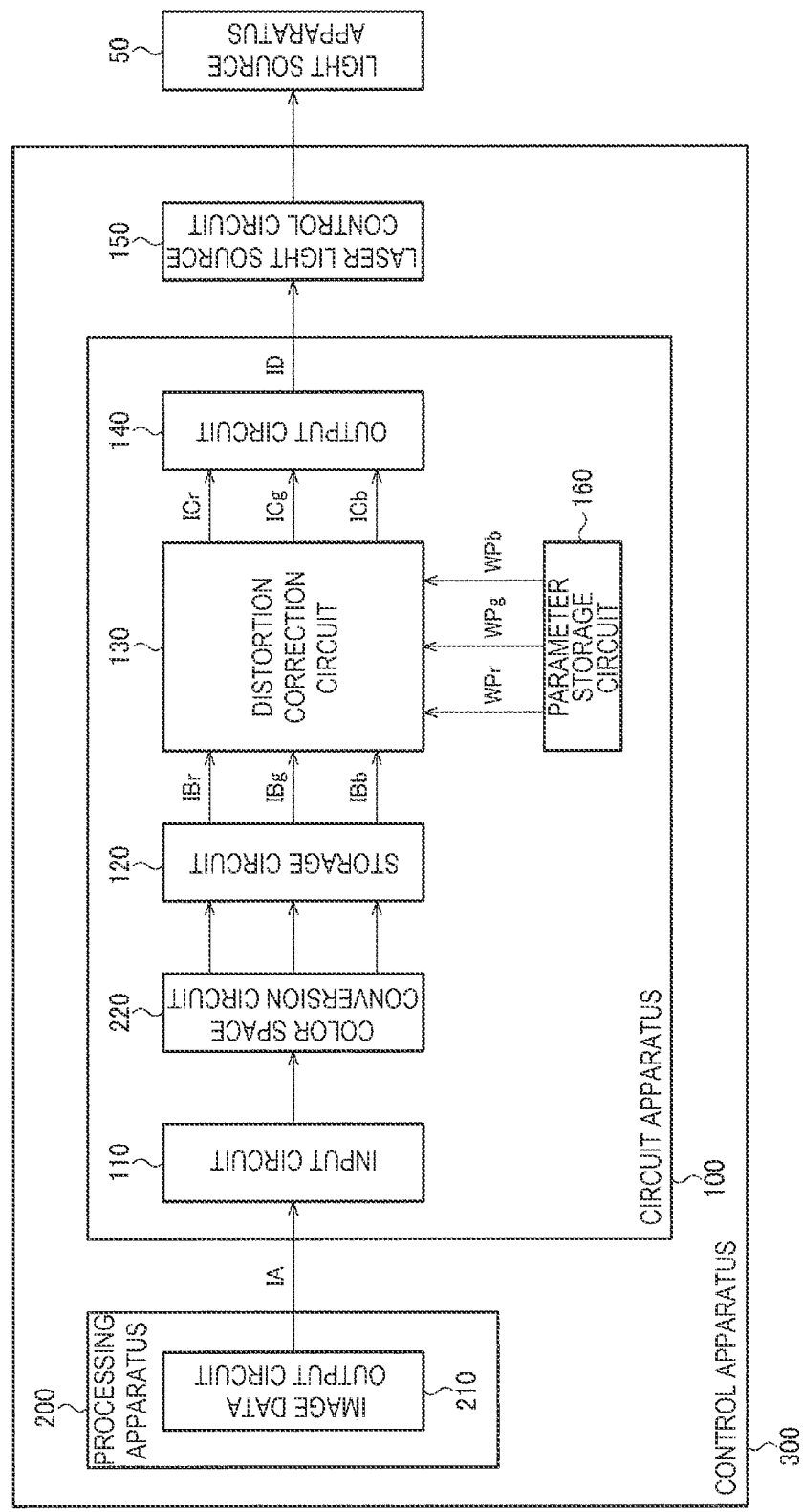
FIG. 8 shows a second configuration example of the control apparatus according to the embodiment.

FIG. 8 shows a second configuration example of the control apparatus 300 according to the present embodiment. In the second configuration example, the color space conversion circuit 220 is provided in the circuit apparatus 100 instead of the processing apparatus 200. The same components as those already described have the same reference characters and will not be described as appropriate.

The processing apparatus 200 includes the image data output circuit 210. The processing apparatus 200 transmits the display image data IA outputted by the image data output circuit 210 to the circuit apparatus 100.

The circuit apparatus 100 includes the input circuit 110, the color space conversion circuit 220, the storage circuit 120, the distortion correction circuit 130, the output circuit 140, and the parameter storage circuit 160. The input circuit 110 receives the display image data IA from the processing apparatus 200. The color space conversion circuit 220 converts the color space of the display image data IA and outputs the display image data IBr, IBg, and IBb having undergone the color space conversion. The storage circuit 120 stores the display image data IBr, IBg, and IBb having undergone the color space conversion and having been outputted by the color space conversion circuit 220. The following operation is the same as that in the first configuration example.

In the embodiment described above, the circuit apparatus 100 includes the color space conversion circuit 220. The color space conversion circuit 220 converts the color space of the inputted image data and outputs the display image data IBr, IBg, and IBb having undergone the color space conversion.

According to the present embodiment, the circuit apparatus 100, which is the display controller or the HUD controller, can perform the color space conversion. Since the display image data having undergone the color space conversion into the color space corresponding to the wavelengths of the laser beams are displayed by performing the color space conversion, the displayed image has appropriate colors.

Figure 9:
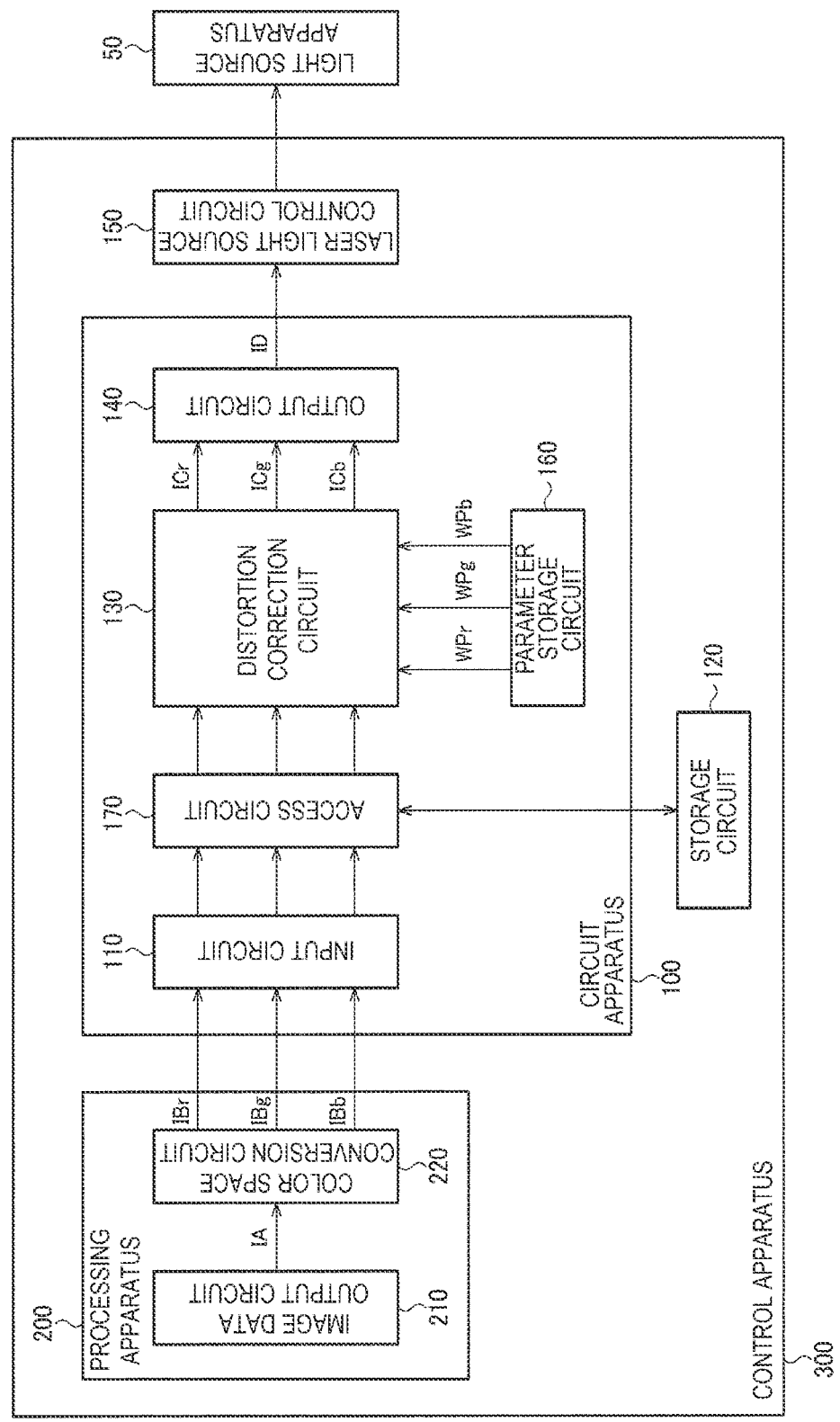
FIG. 9 shows a third configuration example of the control apparatus according to the embodiment.

FIG. 9 shows a third configuration example of the control apparatus 300 according to the present embodiment. In the third configuration example, the storage circuit 120 is provided as a component external to the circuit apparatus 100. For example, as a conceivable case, the circuit apparatus 100 is a processor such as a microcomputer, and a memory IC is provided as the storage circuit 120 as a component external to the processor. The same components as those already described have the same reference characters and will not be described as appropriate.

The circuit apparatus 100 includes the input circuit 110, an access circuit 170, the distortion correction circuit 130, the output circuit 140, and the parameter storage circuit 160.

The access circuit 170 controls write access and read access to the storage circuit 120. The access circuit 170 writes the display image data IBr, IBg, and IBb received by the input circuit 110 and having undergone the color space conversion to the storage circuit 120. The access circuit 170 also reads the display image data IBr, IBg, and IBb stored in the storage circuit 120. The storage circuit 120 is a semiconductor memory, for example, a volatile memory such as a DRAM.

The distortion correction circuit 130 performs the distortion correction on the display image data IBr, IBg, and IBb read by the access circuit 170 on a color basis and outputs the display image data ICr, ICg, and ICb having undergone the correction. The following operation is the same as that in the first configuration example.

Figure 10:
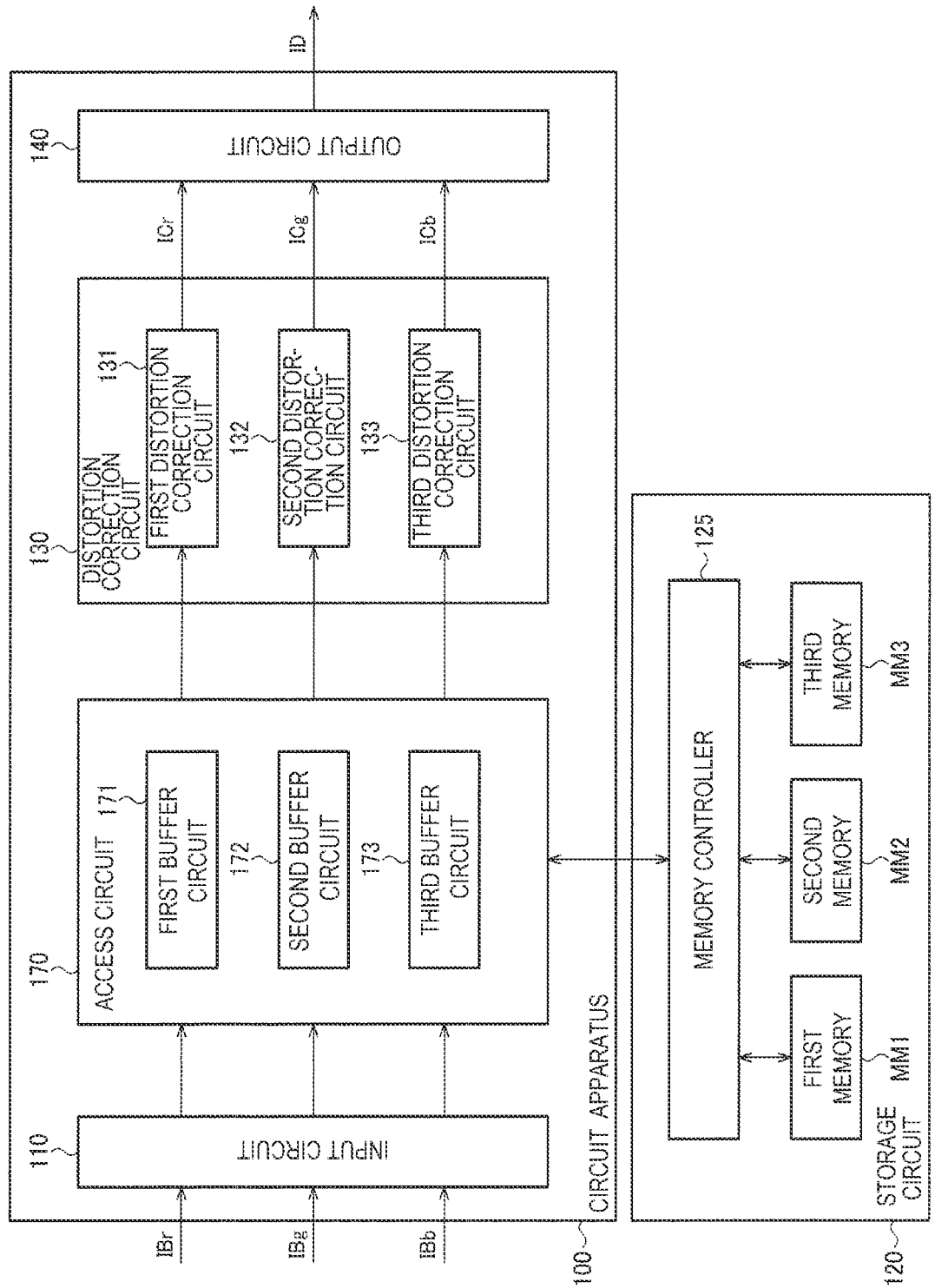
FIG. 10 shows a first detailed configuration example of the circuit apparatus and a storage circuit in the third configuration example of the control apparatus.

FIG. 10 shows a first detailed configuration example of the circuit apparatus 100 and the storage circuit 120 in the third configuration example of the control apparatus 300. It is noted that FIG. 10 does not show the parameter storage circuit 160.

The access circuit 170 includes a first buffer circuit 171, which buffers the red image data IBr, a second buffer circuit 172, which buffers the green image data IBg, and a third buffer circuit 173, which buffers the blue image data IBb. The storage circuit 120 includes a memory controller 125, a first memory MM1, which stores the red image data IBr, a second memory MM2, which stores the green image data IBg, and a third memory circuit MM3, which stores the blue image data IBb.

The first memory MM1, the second memory MM2, and the third memory MM3 are each a physically independent memory and formed of one or more memory ICs. The memory controller 125 controls, based on the write access and the read access from the access circuit 170, the operation of writing and reading data to and from the first memory MM1, the second memory MM2, and the third memory MM3.

The access circuit 170 writes the red image data IBr received by the input circuit 110 to the first memory MM1. The first distortion correction circuit 131 specifies a read address in the first memory MM1, the read address corresponding to pixel data to be read in the distortion correction, and the access circuit 170 reads the pixel data of the red image data IBr based on the read address and outputs the read pixel data to the first distortion correction circuit 131. The first buffer circuit 171 temporarily buffers the red image data IBr when the access circuit 170 writes or reads the red image data IBr to or from the first memory MM1. The second distortion correction circuit 132, the second memory MM2, and the second buffer circuit 172 perform the same processing on the green image data IBg, and the third distortion correction circuit 133, the third memory MM3, and the third buffer circuit 173 perform the same processing on the blue image data IBb.

Figure 11:
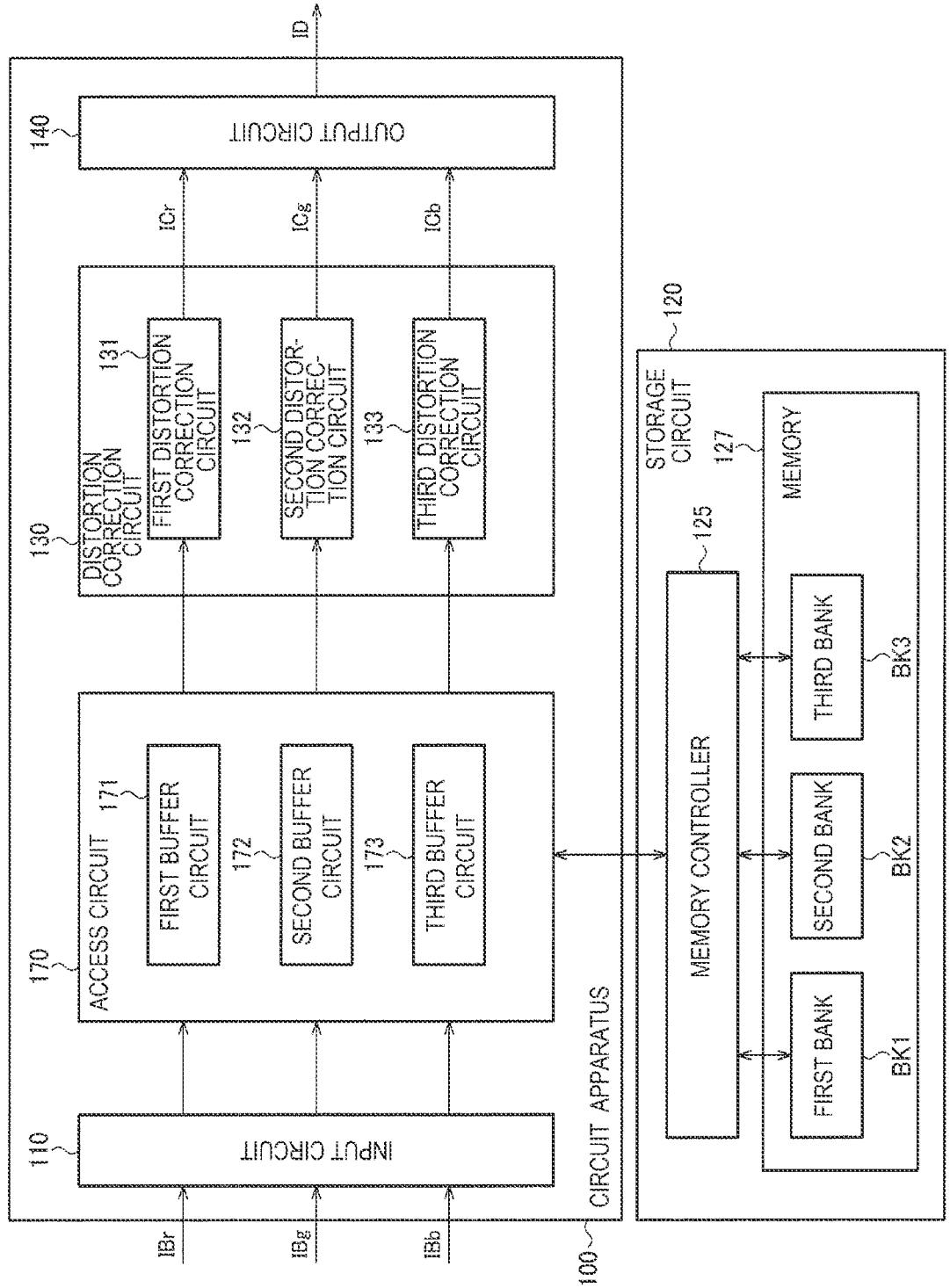
FIG. 11 shows a second detailed configuration example of the circuit apparatus and the storage circuit in the third configuration example of the control apparatus.

FIG. 11 shows a second detailed configuration example of the circuit apparatus 100 and the storage circuit 120 in the third configuration example of the control apparatus 300. It is noted that FIG. 11 does not show the parameter storage circuit 160.

The storage circuit 120 includes the memory controller 125 and a memory 127.

The memory 127 is formed of one or more memory ICs. In the memory 127, a first bank BK1, a second bank BK2, and a third bank BK3 are each set as a logical configuration unit of the memory area. The first bank BK1 is a bank that stores the red image data IBr, the second bank BK2 is a bank that stores the green image data IBg, and the third bank BK3 is a bank that stores the blue image data IBb. The memory controller 125 controls the write access and the read access to the first bank BK1, the second bank BK2, and the third bank BK3.

The access circuit 170 writes the red image data IBr received by the input circuit 110 to the first bank BK1. The first distortion correction circuit 131 specifies a read address in the first bank BK1, the read address corresponding to pixel data to be read in the distortion correction, and the access circuit 170 reads the pixel data of the red image data IBr based on the read address and outputs the read pixel data to the first distortion correction circuit 131. The first buffer circuit 171 temporarily buffers the red image data IBr when the access circuit 170 writes or reads the red image data IBr to or from the first bank BK1. The second distortion correction circuit 132, the second bank BK2, and the second buffer circuit 172 perform the same processing on the green image data IBg, and the third distortion correction circuit 133, the third bank BK3, and the third buffer circuit 173 perform the same processing on the blue image data IBb.

The circuit apparatus according to the embodiment described above is used in a laser projector that projects an image onto a projection surface by using laser beams having different wavelengths or a plurality of colors. The circuit apparatus includes a distortion correction circuit that performs distortion correction on a color basis on display image data corresponding to the plurality of colors, and an output circuit that outputs the display image data as a result of the distortion correction. The distortion correction circuit performs the distortion correction on a color basis by using warp parameters different from one another among the plurality of colors.

According to the present embodiment, the distortion correction circuit can correct the shifts of the display positions on a color basis by performing the distortion correction on a color basis using the warp parameters different from one another among the plurality of colors. That is, since the distortion correction circuit can differentiate the amount of distortion correction among the plurality of colors by performing the distortion correction on a color basis, whereby the correction of the shifts of the display positions on a color basis can be part of the distortion correction. That is, the distortion correction circuit can correct video image distortion caused by distortion of the screen or any other component and further correct the shifts of the display positions on a color basis. The color shift can thus be corrected based on the image data processing, whereby the circuit can be simplified as compared with the scan timing adjustment approach.

In the present embodiment, the circuit apparatus may include storage circuits on a color basis that store the display image data on a color basis.

According to the present embodiment, data can be read out by independently specifying read addresses on a color basis in the storage circuits. The distortion correction on a color basis and the color shift correction can be achieved without an increase in the frequency of the operating clock, that is, at the same frequency of the operating clock as that used when the same distortion correction is performed for all the plurality of colors.

In the present embodiment, the warp parameters on a color basis may be warp parameters based on image distortion caused by distortion of the projection surface, image distortion caused by an optical system, and the shifts of the display positions on a color basis.

When the distortion correction circuit performs the distortion correction on a color basis by using the thus determined warp parameters, the image distortion caused by distortion of the projection surface and the image distortion caused by the optical system can be corrected, and the shifts of the display positions on a color basis can also be corrected.

In the present embodiment, the display image data may be image data as a result of color space conversion into the color space corresponding to the wavelengths of the laser beams.

The color space of the display image data before the color space conversion typically differs from the color space produced by the laser beams. The display image data displayed with no change are therefore displayed in colors different from originally intended colors. According to the present embodiment, in which the display image data having undergone the color space conversion into the color space corresponding to the wavelengths of the laser beams are displayed, the displayed image has appropriate colors.

In the present embodiment, the circuit apparatus may include a color space conversion circuit that performs the color space conversion on inputted image data and outputs display image data as a result of the color space conversion.

According to the present embodiment, the circuit apparatus can perform the color space conversion. Since the display image data having undergone the color space conversion into the color space corresponding to the wavelengths of the laser beams are displayed by performing the color space conversion, the displayed image has appropriate colors.

In the present embodiment, the plurality of colors may include red, green, and blue.

The laser projector thus uses laser beams having at least the three primary colors or RGB to display an image and can therefore display an RGB color image.

In the present embodiment, the circuit apparatus may include a first storage circuit that stores first display image data corresponding to, among the plurality of colors including first, second, and third colors, the first color, a second storage circuit that stores second display image data corresponding to the second color, and a third storage circuit that stores third display image data corresponding to the third color. The distortion correction circuit may include a first distortion correction circuit, a second distortion correction circuit, and a third distortion correction circuit. The first distortion correction circuit may perform the distortion correction on the first display image data from the first storage circuit by using a first warp parameter corresponding to the first color. The second distortion correction circuit may perform the distortion correction on the second display image data from the second storage circuit by using a second warp parameter corresponding to the second color. The third distortion correction circuit may perform the distortion correction on the third display image data from the third storage circuit by using a third warp parameter corresponding to the third color.

According to the present embodiment, the first, second, and third distortion correction circuits can independently specify read addresses in the first, second, and third storage circuits, respectively, to read data therefrom. The distortion correction on a color basis and the color shift correction can be achieved without an increase in the frequency of the operating clock, that is, at the same frequency of the operating clock as that used when the same distortion correction is performed for all the plurality of colors.

The control apparatus according to the present embodiment controls a laser projector that projects an image onto a projection surface by using laser beams having different wavelengths or a plurality of colors. The control apparatus includes a distortion correction circuit that performs distortion correction on a color basis on display image data corresponding to the plurality of colors, and an output circuit that outputs the display image data as a result of the distortion correction. The distortion correction circuit performs the distortion correction on a color basis by using warp parameters different from one another among the plurality of colors.

In the present embodiment, the control apparatus may include a color space conversion circuit that converts the color space of inputted image data into the color space corresponding to the wavelengths of the laser beams and outputs the converted display image data.

In the present embodiment, the control apparatus may include storage circuits on a color basis that store the display image data on a color basis.

In the control apparatus according to the present embodiment, the warp parameters on a color basis may be warp parameters based on image distortion caused by distortion of a display receiving surface, image distortion caused by distortion produced by an optical system, and the shifts of the display positions on a color basis.

In the control apparatus according to the present embodiment, the plurality of colors may include red, green, and blue.

In the present embodiment, the control apparatus may include a first storage circuit that stores first display image data corresponding to, among a plurality of colors including first, second, and third colors, the first color, a second storage circuit that stores second display image data corresponding to the second color, and a third storage circuit that stores third display image data corresponding to the third color. The distortion correction circuit may include a first distortion correction circuit, a second distortion correction circuit, and a third distortion correction circuit. The first distortion correction circuit may perform the distortion correction on the first display image data from the first storage circuit by using a first warp parameter corresponding to the first color. The second distortion correction circuit may perform the distortion correction on the second display image data from the second storage circuit by using a second warp parameter corresponding to the second color. The third distortion correction circuit may perform the distortion correction on the third display image data from the third storage circuit by using a third warp parameter corresponding to the third color.

The laser projector according to the present embodiment includes any of the circuit apparatuses described above, a plurality of laser light sources that output the laser beams having the plurality of colors, a laser light source control circuit that controls the plurality of laser light sources based on the display image data as a result of the distortion correction from the output circuit, and an optical system that projects the laser beams having the plurality of colors onto the projection surface.

The laser projector according to the present embodiment includes any of the control apparatuses described above, a plurality of laser light sources that output the laser beams having the plurality of colors, and an optical system that projects the laser beams having the plurality of colors onto the projection surface. The control apparatus includes a laser light source control circuit that controls the plurality of laser light sources based on the display image data as a result of the distortion correction from the output circuit.

The present embodiment has been described above in detail, and a person skilled in the art will readily appreciate that a large number of variations are conceivable to the extent that they do not substantially depart from the novel items and effects of the present disclosure. Such variations are all therefore intended to fall within the scope of the present disclosure. For example, a term described at least once in the specification or the drawings along with a different term having a broader meaning or the same meaning can be replaced with the different term anywhere in the specification or the drawings. Furthermore, all combinations of the present embodiment and the variations fall within the scope of the present disclosure. The configurations, operations, and the like of the circuit apparatus, the processing apparatus, the laser light source control circuit, the control apparatus, the light source apparatus, the laser projector, and the like are also not limited to those described in the present embodiment, and a variety of variations are conceivable.

What is claimed is:

1. A circuit apparatus used in a laser projector that projects an image onto a projection surface by using laser beams having different wavelengths or a plurality of colors, the circuit apparatus comprising:
    a distortion correction circuit that performs distortion correction on a color basis on display image data corresponding to the plurality of colors; and
    an output circuit that outputs the display image data as a result of the distortion correction,
    wherein the distortion correction circuit performs the distortion correction on the color basis by using warp parameters different from one another among the plurality of colors, and
    the warp parameters include a parameter corresponding to image distortion caused by distortion of the projection surface.

2. The circuit apparatus according to claim 1, further comprising:
    storage circuits on the color basis that store the display image data on the color basis.

3. The circuit apparatus according to claim 1,
    wherein the warp parameters on the color basis include parameters corresponding to image distortion caused by an optical system and shifts of display positions on the color basis.

4. The circuit apparatus according to claim 1,
    wherein the display image data are image data as a result of color space conversion into a color space corresponding to the wavelengths of the laser beams.

5. The circuit apparatus according to claim 4, further comprising:
    a color space conversion circuit that performs the color space conversion on inputted image data and outputs the display image data as the result of the color space conversion.

6. The circuit apparatus according to claim 1,
    wherein the plurality of colors include red, green, and blue.

7. The circuit apparatus according to claim 1, further comprising:
    a first storage circuit that stores first display image data corresponding to, among the plurality of colors including first, second, and third colors, the first color;
    a second storage circuit that stores second display image data corresponding to the second color; and
    a third storage circuit that stores third display image data corresponding to the third color,
    wherein the distortion correction circuit includes:
        a first distortion correction circuit that performs the distortion correction on the first display image data from the first storage circuit by using a first warp parameter corresponding to the first color;
        a second distortion correction circuit that performs the distortion correction on the second display image data from the second storage circuit by using a second warp parameter corresponding to the second color; and
        a third distortion correction circuit that performs the distortion correction on the third display image data from the third storage circuit by using a third warp parameter corresponding to the third color.

8. A laser projector comprising:
    the circuit apparatus according to claim 1;
    a plurality of laser light sources that output the laser beams having the plurality of colors;
    a laser light source control circuit that controls the plurality of laser light sources based on the display image data as a result of the distortion correction from the output circuit; and
    an optical system that projects the laser beams having the plurality of colors onto the projection surface.

9. A control apparatus that controls a laser projector that projects an image onto a projection surface by using laser beams having different wavelengths or a plurality of colors, the control apparatus comprising:
    a distortion correction circuit that performs distortion correction on a color basis on display image data corresponding to the plurality of colors; and
    an output circuit that outputs the display image data as a result of the distortion correction,
    wherein the distortion correction circuit performs the distortion correction on the color basis by using warp parameters different from one another among the plurality of colors, and
    the warp parameters include a parameter corresponding to image distortion caused by distortion of the projection surface.

10. The control apparatus according to claim 9, further comprising:
    a color space conversion circuit that converts a color space of inputted image data into a color space corresponding to the wavelengths of the laser beams and outputs the display image data.

11. The control apparatus according to claim 9, further comprising:
    storage circuits on the color basis that store the display image data on the color basis.

12. The circuit apparatus according to claim 9,
    wherein the warp parameters on the color basis include parameters corresponding to image distortion caused by an optical system and shifts of display positions on the color basis.

13. The circuit apparatus according to claim 9,
    wherein the plurality of colors include red, green, and blue.

14. The control apparatus according to claim 9, further comprising:
    a first storage circuit that stores first display image data corresponding to, among the plurality of colors including first, second, and third colors, the first color;
    a second storage circuit that stores second display image data corresponding to the second color; and
    a third storage circuit that stores third display image data corresponding to the third color,
    wherein the distortion correction circuit includes:
        a first distortion correction circuit that performs the distortion correction on the first display image data from the first storage circuit by using a first warp parameter corresponding to the first color;
        a second distortion correction circuit that performs the distortion correction on the second display image data from the second storage circuit by using a second warp parameter corresponding to the second color; and a third distortion correction circuit that performs the distortion correction on the third display image data from the third storage circuit by using a third warp parameter corresponding to the third color.

15. A laser projector comprising:

the control apparatus according to claim 9;

a plurality of laser light sources that output the laser beams having the plurality of colors; and an optical system that projects the laser beams having the plurality of colors onto the projection surface, wherein the control apparatus includes a laser light source control circuit that controls the plurality of laser light sources based on the display image data as a result of the distortion correction from the output circuit.

16. A circuit apparatus used in a laser projector that projects an image onto a projection surface by using laser beams having different wavelengths or a plurality of colors, the circuit apparatus comprising:

a distortion correction circuit that performs distortion correction on a color basis on display image data corresponding to the plurality of colors;

an output circuit that outputs the display image data as a result of the distortion correction;

a first storage circuit that stores first display image data corresponding to, among the plurality of colors including first, second, and third colors, the first color;

a second storage circuit that stores second display image data corresponding to the second color; and a third storage circuit that stores third display image data corresponding to the third color, wherein the distortion correction circuit performs the distortion correction on the color basis by using warp parameters different from one another among the plurality of colors, and the distortion correction circuit includes:

a first distortion correction circuit that performs the distortion correction on the first display image data from the first storage circuit by using a first warp parameter corresponding to the first color;

a second distortion correction circuit that performs the distortion correction on the second display image data from the second storage circuit by using a second warp parameter corresponding to the second color; and a third distortion correction circuit that performs the distortion correction on the third display image data from the third storage circuit by using a third warp parameter corresponding to the third color.

17. The circuit apparatus according to claim 16, wherein the warp parameters on the color basis are warp parameters based on image distortion caused by distortion of the projection surface, image distortion caused by an optical system, and shifts of display positions on the color basis.

18. The circuit apparatus according to claim 16, wherein the plurality of colors include red, green, and blue.

* * * * *